US007857281B2

(12) United States Patent
Pfaff

(10) Patent No.: US 7,857,281 B2
(45) Date of Patent: Dec. 28, 2010

(54) ELECTROHYDRAULIC VALVE CONTROL CIRCUIT WITH MAGNETIC HYSTERESIS COMPENSATION

(75) Inventor: Joseph L. Pfaff, Wauwatosa, WI (US)

(73) Assignee: INCOVA Technologies, Inc., Waukesha, WI (US)

( * ) Notice: Subject to any disclaimer, the term of this patent is extended or adjusted under 35 U.S.C. 154(b) by 1220 days.

(21) Appl. No.: 11/426,397

(22) Filed: Jun. 26, 2006

(65) Prior Publication Data

US 2008/0042087 A1 Feb. 21, 2008

(51) Int. Cl.
*F16K 51/00* (2006.01)

(52) U.S. Cl. ................................................ 251/129.04

(58) Field of Classification Search ............ 251/129.04, 251/129.01; 361/153, 154, 187
See application file for complete search history.

(56) References Cited

U.S. PATENT DOCUMENTS 4,813,443 A * 3/1989 Pounder ................ 251/129.05
4,970,622 A * 11/1990 Buchl ......................... 361/154
5,024,417 A * 6/1991 Voxbrunner ........... 251/129.04
5,465,757 A * 11/1995 Peters ................... 251/129.04
5,615,832 A * 4/1997 Price ............................. 239/8
5,781,397 A * 7/1998 Schrey ....................... 361/154
5,933,313 A * 8/1999 Furukawa ................... 361/154
6,158,715 A * 12/2000 Kirschbaum ................ 361/187
6,176,212 B1 * 1/2001 Vilou ......................... 361/154
6,188,561 B1 * 2/2001 Heimberg ................... 361/154
6,286,532 B1 * 9/2001 van Nieuwstadt et al. ..................... 251/129.04
6,328,275 B1 12/2001 Yang et al.
6,364,281 B1 * 4/2002 DeLand et al. ......... 251/129.04
6,571,757 B1 6/2003 Simpson
6,775,974 B2 8/2004 Tabor
6,938,592 B2 9/2005 Taylor et al.
2005/0211936 A1 * 9/2005 Tabor et al. ............ 251/129.04

FOREIGN PATENT DOCUMENTS

DE 4327523 A1 2/1994
DE 19813913 A1 9/1999
EP 1041329 A3 8/2002
JP 58161305 A 9/1983

* cited by examiner

*Primary Examiner*—John Bastianelli
(74) *Attorney, Agent, or Firm*—Quarles & Brady; George E. Haas

(57) ABSTRACT

A method for operating an electrohydraulic valve initially derives a characterization value that denotes how magnetic hysteresis affects valve operation. Upon receiving a command that designates a desired magnitude of electric current to be applied to the electrohydraulic valve, that command is modified based on the characterization value to compensate for the magnetic hysteresis. The modified command then is employed to apply electric current to the electrohydraulic valve.

19 Claims, 2 Drawing Sheets

FIG. 1
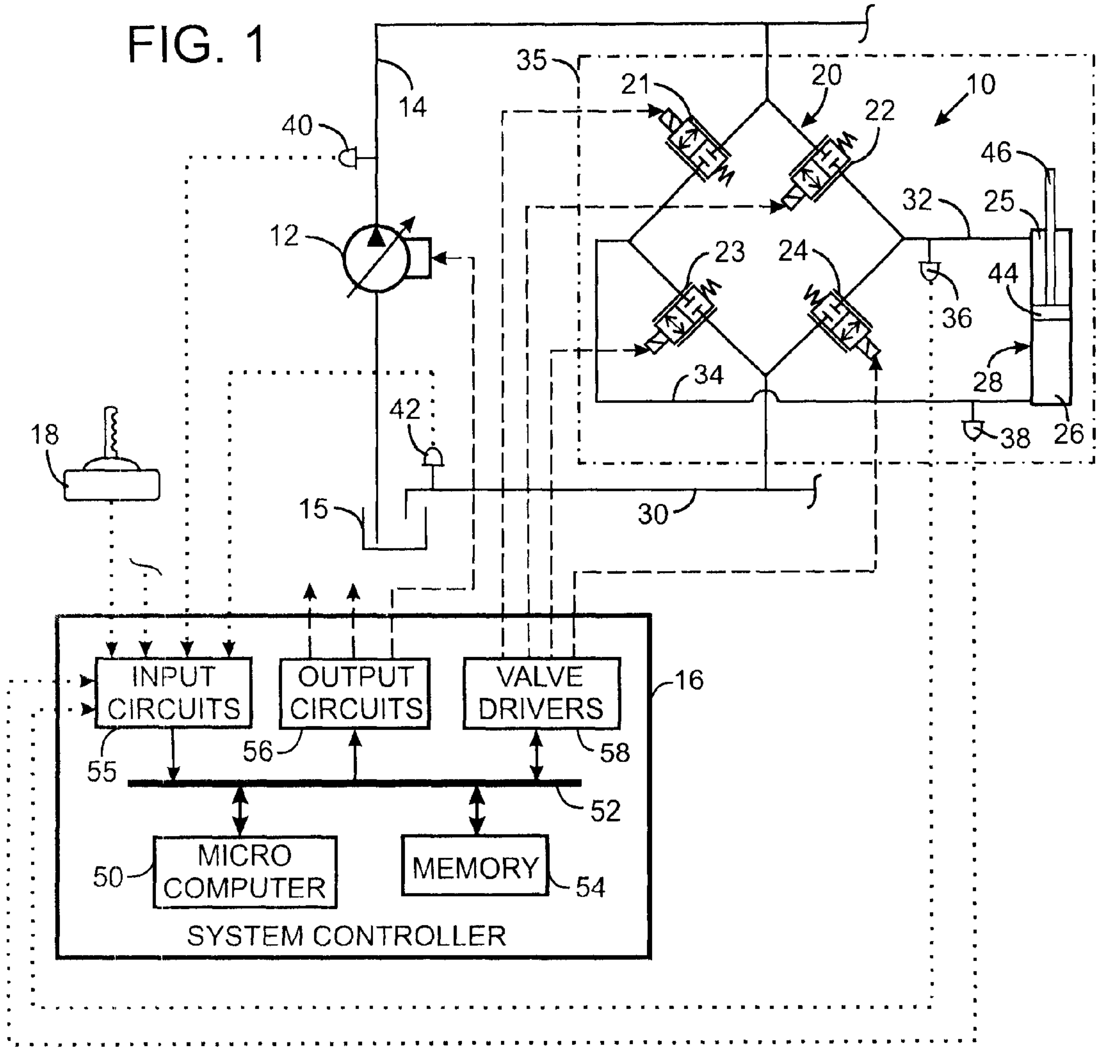
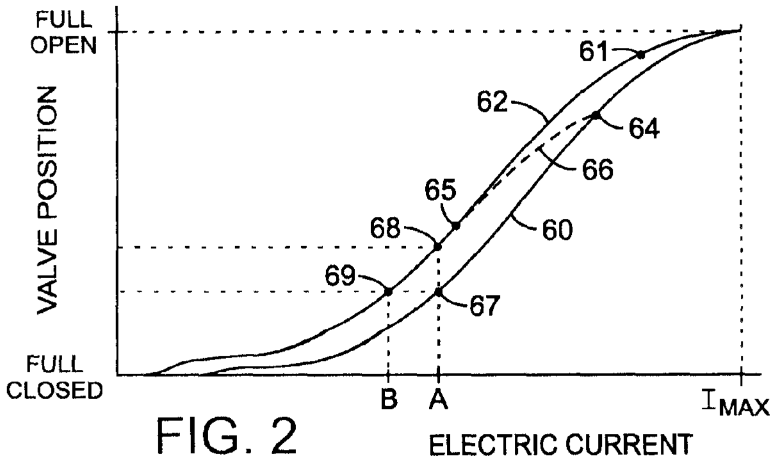
FIG. 2

ELECTROHYDRAULIC VALVE CONTROL CIRCUIT WITH MAGNETIC HYSTERESIS COMPENSATION

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic power systems with electrically operated control valves, and more particularly to electrical circuits that control the application of electricity to such valves.

2. Description of the Related Art

A wide variety of machines have movable members which are driven by a hydraulic actuator, such as a cylinder and piston arrangement, that is controlled by a hydraulic valve. For example, backhoes have a tractor on which is mounted a boom, arm and bucket assembly with each of those components being driven by one of more cylinder-piston arrangements. The flow of fluid to and from each hydraulic actuator is controlled by a hydraulic valve that traditionally was manually operated by the machine operator.

There is a present trend away from manually operated hydraulic valves toward electrical controls and the use of solenoid valves. This type of control simplifies the hydraulic plumbing, as the control valves do not have to be located near an operator station, but can be located adjacent the hydraulic actuator being driven by the fluid. This change in technology also facilitates computerized control of the machine functions.

Application of pressurized fluid from a pump to the hydraulic actuator is controlled by a set of electrohydraulic proportional pilot-operated valves. These valves employ a solenoid coil which generates a magnetic field that moves an armature in one direction to open a valve. The armature acts on a valve element which opens and closes a pilot passage that in turn causes a main valve poppet to move with respect to a primary valve seat located between the inlet and outlet of the valve. The amount that the valve opens is directly related to the magnitude of electric current applied to the solenoid coil, the electric current produces a variable magnetic field that moves the armature to open the pilot poppet to varying degrees, thereby enabling proportional control of the hydraulic fluid flow. Either the armature or another component is spring loaded to close the valve when electric current is removed from the solenoid coil.

Magnetic hysteresis is the retention of magnetism induced in ferromagnetic materials and affects the operation of the valve as the applied electric current changes. For example, as the electric current decreases to close the valve the residual magnetism tends to keep the valve open slowing the response of the valve to the change in the electric current level. This phenomenon causes a difference between the flow of fluid through the valve that is desired and the actual flow.

Precise control of the electric current that is applied to the solenoid valve is essential for accurate control of the machine motion. However, the magnetic hysteresis adversely affects the precision of that control.

SUMMARY OF THE INVENTION

A control circuit alters the level of electric current applied to operate an electrohydraulic valve so as to compensate for the effects of magnetic hysteresis on valve operation.

The control circuit implements a method that determines an amount of magnetic hysteresis affecting operation of the electrohydraulic valve. Thereafter when a command is produced that designates a desired magnitude of electric current to be applied to the electrohydraulic valve, the command is adjusted for the effects of the magnetic hysteresis to produce a compensated command. Electric current then is applied to the electrohydraulic valve in response to the compensated command.

In a preferred embodiment of the control method, the amount of magnetic hysteresis is determined by varying the magnitude of electric current while sensing a parameter that indicates an amount that the electromagnetically operated valve is open. That parameter could be the position of a valve element, position of a solenoid that operates the valve, or a force in the valve, for example, A first set of data is produced indicating a relationship between the magnitude of electric current and the position of the valve while opening, and a second set of data is produced indicating that relationship while that valve is closing. Additional sets of data are acquired by opening and closing the valve to different positions. The acquired sets of opening and closing data are analyzed to derive a value that characterizes the magnetic hysteresis of the electrohydraulic valve.

In a preferred embodiment, the electric current command is adjusted during valve closure by reducing the desired magnitude of electric current so that the valve has similar responses during opening and closing. The adjustment of the electric current command involves calculating a difference between the desired magnitude of electric current designated by that command and the magnitude of electric current designated by a previous electric current command. That difference is multiplied by the previously derived magnetic hysteresis characterization value. The product of that multiplication is added to a previous compensation value to produce a new compensation value that is employed to adjust the current command. The process also may include limiting the new compensation value to a predefined range.

BRIEF DESCRIPTION OF THE DRAWINGS

FIG. 1 is a schematic diagram of a hydraulic system that incorporates the present invention for operating valves that control a hydraulic actuator;

FIG. 2 is a graph of the relationship between electric current applied to operate a valve and the position of the valve during opening and closing;

DETAILED DESCRIPTION OF THE INVENTION

Figure 3:
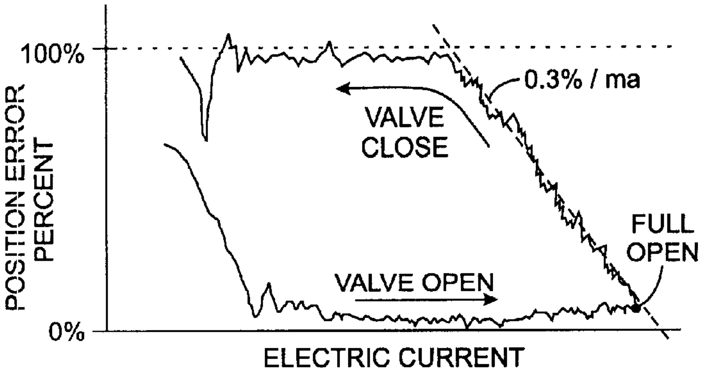
FIG. 3 graphically illustrates a step in the process for characterizing magnetic hysteresis of a valve.

With initial reference to FIG. 1, a machine such as an agricultural or construction vehicle has mechanical members that are operated by a hydraulic system. The hydraulic system 10 includes a variable displacement pump 12 that is driven by a motor or engine (not shown) to draw hydraulic fluid from a tank 15 and furnish the hydraulic fluid under pressure into a supply line 14.

The supply line 14 is connected to a valve assembly 20 comprising four electrohydraulic proportional (EHP) valves 21, 22, 23 and 24, that control the flow of hydraulic fluid to and from a hydraulic actuator, such as cylinder 28, in response to electrical signals from a system controller 16. The first EHP valve 21 governs the flow of fluid from the supply line 14 to a first conduit 34 connected to the head chamber 26 of the cylinder 28. The second EHP valve 22 selectively couples the supply line 14 to a second conduit 32 which leads to the rod chamber 25 of the cylinder 28. The third EHP valve 23 is connected between the first conduit 34 and a return line 30 to the system tank 15. The fourth EHP valve 24 controls flow of fluid between the second conduit 32 and the return line 30. Each of the four EHP valves 21-24 may be a pilot operated valve that is driven by a solenoid, such as the valve described in U.S. Pat. No. 6,328,275, for example. The flow of fluid through this type of valve is proportionally controlled by varying the magnitude of electric current applied to the coil of the solenoid.

The valve assembly 20 and the cylinder 28 form a hydraulic function 35 for operating a component of the machine. Additional hydraulic functions can be connected to the supply and return lines 14 and 30 and operated by the system controller 16.

The system controller 16 receives signals from a user input device, such as joystick 18 or the like, and from a number of pressure sensors. One pair of pressure sensors 36 and 38 detect the pressure within the cylinder rod and head chambers 25 and 26, respectively. Another pressure sensor 40 is placed in the supply line 14 near the outlet of the pump 12, while pressure senor 42 is located in the tank return line 30, to provide pressure measurement signals. The system controller 16 executes a software program that responds to these input signals by producing output signals which control the variable displacement pump 12 and the four EHP valves 21-24.

With continuing reference to FIG. 1, the system controller 16 includes a microcomputer 50 which is connected by a conventional set of signal busses 52 to a memory 54 in which the software programs and data used by the microcomputer are stored. The set of signal busses 52 also connects input circuits 55 and output circuits 56 to the microcomputer 50. The input circuits 55 interface the joystick 18 and the pressure sensors to the system controller and the output circuits 56 provide signals to devices that indicate the status of the hydraulic system 10 and the functions being controlled.

A set of valve drivers 58 in the system controller 16 responds to commands from the microcomputer by generating pulse width modulated (PWM) signals that are applied to the solenoid coils of the EHP valves 21-24. Each PWM signal is generated in a conventional manner by switching a DC voltage at a given frequency. When the hydraulic system is on a vehicle, such as an agricultural tractor, the DC voltage is supplied from a battery and an alternator. By controlling the duty cycle of the PWM signal, the magnitude of electric current applied to the solenoid coil of a given valve can be varied, thus altering the degree to which that valve opens.

In order to extend the rod 46 from the cylinder 28, the operator moves the joystick 18 in the appropriate direction to send an electrical signal to the system controller that indicates the desired velocity for the associated machine member. The system controller 16 responds to the joystick signal by generating electric current commands designating electric current magnitudes for driving the solenoid coils of selected EHP valves in order to produce the motion indicated by the machine operator.

If the operator desires to extend the rod 46 from the cylinder 28, the generated electric current commands activate the first and fourth EHP valves 21 and 24. Opening the first valve 21 sends pressurized hydraulic fluid from the supply line 14 through the into the head chamber 26 of cylinder 28 and the fluid from the rod chamber 25 flows through the fourth EHP valve 24 to the tank 15. The system controller 16 monitors the pressure in the various hydraulic lines to ensure that proper motion occurs. To retract the rod 46 into the cylinder 28, the system controller 16 opens the second and third EHP valves 22 and 23, which sends pressurized hydraulic fluid from the supply line 14 into the cylinder's rod chamber 25 and exhausts fluid from the head chamber 26 to tank 15.

Typical control of the machine involves the human operator manipulating the joystick 18 to extend and retract the piston rod 46 with respect to the cylinder 28 which produces bidirectional motion of the machine components connected to the piston rod. Thus, the hydraulic valves in assembly 20 are opened and closed to various degrees by correspondingly varying the electric currents applied to those valves. The response of a given hydraulic valve to changes in the electric current applied to its solenoid coil is affected by magnetic hysteresis caused by the residual magnetism of the ferromagnetic materials in the valve. For example, while electric current applied to a valve increases as represented by curve 60 in FIG. 2, the position of the valve, or more precisely a flow control element (a poppet or spool) within the valve, changes until reaching a fully open position at a maximum electric current level ($I_{MAX}$). When the valve then is closed by reducing the electric current, the position of the valve changes according to a second curve 62. Because of the magnetic hysteresis the electric current to valve position relationship is different during opening and closing the valve. Note that the valve reaches a given position at a lower electric current level while closing than when the valve was opening. The two curves 60 and 62 depict a conventional hysteresis function.

If the valve is only partially opened before the operator commands closure, a slightly different hysteresis function occurs. For example, if the valve is opened to an intermediate position indicated by point 64 in FIG. 2 and then commanded to close, the relationship of the closure electric current to valve position follows the dashed line 66. As a consequence, there is not a fixed relationship between the magnitude of the electric current applied to the solenoid coil and the position of the valve, as well as the amount of fluid flow through the valve. The present invention compensates the electric current command sent to the valve drivers 58 in order to account for the magnetic hysteresis and thus more precisely control the position of the valve and the fluid flow there through.

The present compensation technique accounts for the amount that the closing curve 62 differs from the opening curve 60. Specifically, when the valve is closing the command from the microcomputer 50 designating the amount of electric current to be applied to a given valve, is adjusted by subtracting a compensation factor. For example, as graphically shown in FIG. 2, a command designating an electric current level A opens the valve to a position at point 67 when the valve is opening, but the same electric current command results in a different valve position at point 68 when the valve closes. As a result, in order that the command designating electric current level A places the valve into the same position during opening and closing, the current command during closure must be adjusted to designate a lower electric current level B, as designated at point 69. Thus, the difference between electric current levels A and B (e.g. 30 ma) is defined as the magnetic hysteresis for the full cycle of the valve and at that point must be subtracted from the electric current command during closure to compensate for the magnetic hysteresis.

However, that current level difference is not constant during the entire closure process. Note that during the initial part of the motion from the fully open position, for example a point 61, a smaller current level difference is present than when the valve has closed farther such as at points 67 and 69. This initial part of the motion also shifts depending upon the position to which the valve is opened before closure commences. For example, if the valve is opened only to point 64 in FIG. 2, the closure produces a resultant relationship between electric current and valve position designated by the dashed line 66 which deviates from the closing curve 62 that occurs during valve closure from the full open position. Therefore, in order to accurately compensate for magnetic hysteresis, this variation must be taken into account.

As a consequence, the magnetic hysteresis compensation technique employs several variables defining the operating characteristic of a particular valve or particular valve model. Although, it is desirable for optimum compensation to characterize the operation of each specific electrical operator, significant compensation can be achieved by classifying the characteristics of a particular design of the valve and its electrical operator (e.g. a solenoid) which then are used for all valves of that type. The characterization process involves operating the valve in a cycle between open and closed position. This is accomplished by increasing the level of electric current applied to the valve from zero to a level at which the valve is fully open, and then decreasing the current until returning to the fully closed position. At various increments during this electric current cycle, the position of the valve is measured to provide data similar to that denoted by curves 60 and 62 in FIG. 2. The position of the valve can be measured directly or indirectly by measuring a related parameter, such as the position of the solenoid. Then, a similar set of small current cycles are performed by opening the valve to less than fully open, for example, 0% to 20% of full open, 0% to 40%, 20% to 60%, etc. The resultant data compiled by the small cycles is then compared to the data from the full valve cycle. The rate at which the small cycles data approaches the full cycles data is calculated.

Specifically, the magnetic hysteresis characterization determines the amount that the closing curves (e.g. 62 and 66) deviate from the opening curve 60. Therefore, data points defining the opening curve 60 are considered to have a zero percent error, whereas the data points on the closing curve 62 are considered as a 100 percent error. Similarly an error percentage is calculated for the data from a partially opened valve, that is the percentage the each data point of the small valve operating cycle deviates from the full cycle. FIG. 3 is an exemplary graph of such error percentages. The percent error data are examined to determine the rate at which it makes the transition from point 64 to point 65 where the small cycle curve 66 joins the full cycle closing curve 62. As seen from the plot of the exemplary data, the small cycle data approaches the full cycle data (100% error) at a rate of 0.3% per milliamp. This small cycle transition gain (0.3% per milliamp) is multiplied by the magnetic hysteresis for the full cycle (e.g. 30 ma) to produce a value (e.g. 9% or 0.09) for a variable designated rHYSTERESIS which characterizes the magnetic hysteresis of this particular valve.

Figure 4:
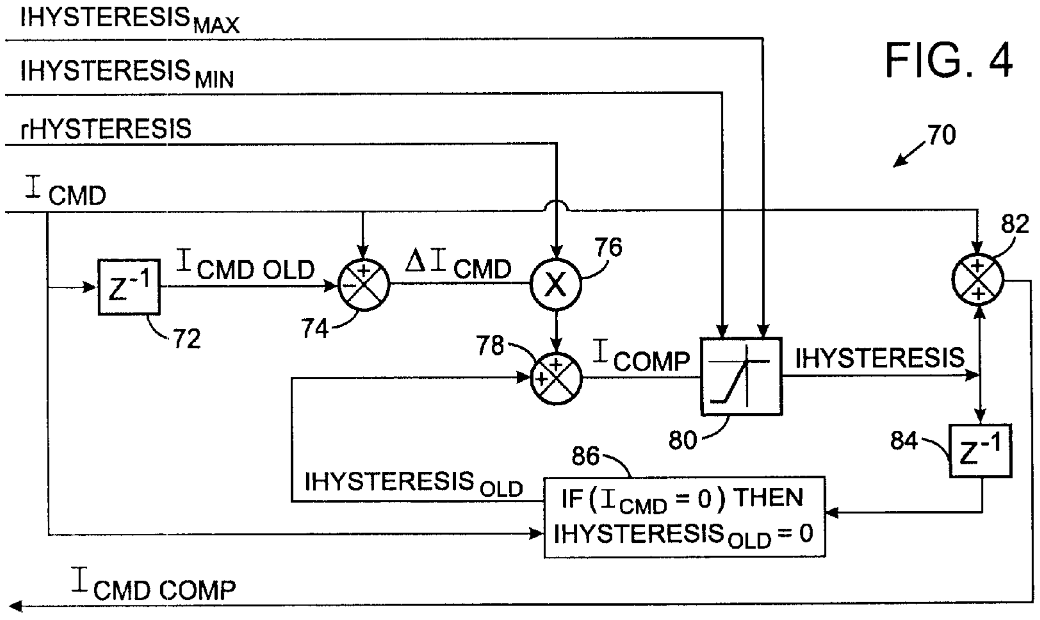
FIG. 4 is a control diagram depicting a magnetic hysteresis compensation algorithm employed by the system controller to operate a valve in the hydraulic system.

The magnetic hysteresis characterization variable rHYSTERESIS is used by the electric current command compensation algorithm that is independently executed by the microcomputer 50 for each of the valves 21-24 in assembly 20. The compensation algorithm 70 depicted in FIG. 4 commences upon the receipt of a new electric current command ($I_{CMD}$) which is produced by the microcomputer 50 in response to the signal from joystick 18. The electric current command is produced by any conventional technique, such as the one described in U.S. Pat. No. 6,775,974, for example. The new electric current command is stored temporarily, as denoted by function 72 that has an output at which the value of the previous electric current command ($I_{CMD\ OLD}$) is provided. The previous electric current command is subtracted from the new electric current command ($I_{CMD}$) at a first function 74 to produce the difference, designated by an intermediate value $\Delta I_{CMD}$. The intermediate value, or command difference, $\Delta I_{CMD}$ then is multiplied at a second function 76 by the magnetic hysteresis characterization value rHYSTERESIS, which for the exemplary system was determined to be 0.09. The resultant product is added to the previous magnetic hysteresis compensation value $IHYSTERESIS_{OLD}$ at summation function 78 to produce a preliminary compensation factor ($I_{COMP}$).

In the exemplary hydraulic system, magnetic hysteresis compensation is active only when the associated valve is closing so that the valve position to electric current relationship during closure will be similar to that when the value is opening. Therefore, by definition the hysteresis compensation value IHYSTERESIS must be zero while the electric current command difference $\Delta I_{CMD}$ is positive, as occurs during valve opening. In addition, the hysteresis compensation value may not exceed a level equal to or slightly smaller than the magnitude of the full cycle magnetic hysteresis (e.g. 30 ma), as that corresponds to the maximum amount of hysteresis requiring compensation. These minimum and maximum compensation limits are respectively defined by two variables $IHYSTERESIS_{MIN}$ and $IHYSTERESIS_{MAX}$, stored in the memory 54 of the system controller 16 to define the range of values that may be subtracted from the current command during valve closure. For the exemplary hydraulic system, $IHYSTERESIS_{MIN}$ equals −30 ma and $IHYSTERESIS_{MAX}$ equals 0.0 ma.

Limiting the magnetic hysteresis compensation value to this range of values is achieved by applying the preliminary compensation factor ($I_{COMP}$) to a first limit function 80 which restricts the compensation value IHYSTERESIS to a negative number that is no more negative than the maximum amount that the full sweep hysteresis curves 60 and 62 deviate from each other. The first limit function 80 for the exemplary hydraulic system restricts the magnetic hysteresis compensation value IHYSTERESIS to between −30 ma and 0.0 ma. Thus when the valve is opening and the preliminary compensation factor ($I_{COMP}$) is positive (the commanded current is increasing), the value of IHYSTERESIS at the output of the first limit function 80 will be zero. It is only upon valve closure that the magnetic hysteresis compensation value IHYSTERESIS has a non-zero value and that value may not adjust the current command more than the full cycle magnetic hysteresis.

The magnetic hysteresis compensation value IHYSTERESIS is applied to an output summation function 82 where it is combined with the present electric current command $I_{CMD}$. Because IHYSTERESIS has a negative number during valve closure, the output summation function 82 reduces the current command ($I_{CMD}$) by the amount of the compensation value to produce the compensated electric current command ($I_{CMD\ COMP}$). The compensated electric current command is transmitted to the valve driver 58 associated with the particular valve and used to control the duty cycle of the PWM signal that drives that valve.

The new value of the magnetic hysteresis compensation value IHYSTERESIS also is stored temporarily in the memory of the system controller 16 as denoted by function 84, to provide the previous compensation value IHYSTER- $ESIS_{OLD}$ each time the compensation algorithm is executed. That previous compensation value is fed back and added at summation function 78 to the produce a preliminary compensation factor ($I_{COMP}$). This loop provides an accumulation of the error due to the hysteresis. A second limit function 86 sets the previous compensation value to zero, if the incoming electric current command ($I_{CMD}$) is zero thereby clearing the accumulated hysteresis error for the next operation of the valve.

In the exemplary hydraulic system, the magnetic hysteresis compensation was employed during valve closure by subtracting a compensation value IHYSTERESIS from the electric current command ($I_{CMD}$) so that the electric current to valve position responses are similar during opening and closing. However, the magnetic hysteresis compensation could have been applied during valve opening by adding a hysteresis compensation value to the electric current command to adjust the valve response while opening to approximate the response that occurs during closing.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method by which a controller operates an electrohydraulic valve, the method comprising:

determining how magnetic hysteresis affects electrohydraulic valve operation;

receiving a command designating a desired magnitude of electric current to be applied to the electrohydraulic valve;

in response to the determining, modifying the command to compensate for the magnetic hysteresis to produce a compensated command, wherein modifying the command comprises deriving an intermediate value denoting change of the command with time and multiplying the intermediate value by another value that characterizes how magnetic hysteresis affects electrohydraulic valve operation; and applying electric current to the electrohydraulic valve in response to the compensated command, wherein a constant magnitude of electric current is applied to the electrohydraulic valve for as long as the command remains unchanged.

2. The method as recited in claim 1 wherein determining how magnetic hysteresis affects electrohydraulic valve operation comprises varying electric current applied to the electrohydraulic valve while sensing a parameter related to an amount that the electrohydraulic valve is open.

3. The method as recited in claim 1 wherein determining how magnetic hysteresis affects electrohydraulic valve operation comprises:

producing a first set of data indicating relationships between magnitudes of electric current applied to the electrohydraulic valve and positions of the electrohydraulic valve while opening;

producing a second set of data indicating relationships between magnitudes of electric current applied to the electrohydraulic valve and positions of the electrohydraulic valve while closing; and analyzing the first and second sets of data.

4. The method as recited in claim 1 wherein modifying the command is performed during only one of while the electrohydraulic valve is opening and while the valve is closing.

5. The method as recited in claim 1 wherein a product of the multiplying is used to derive a compensation amount by adding the product to a previous value of the compensation amount to produce a new value for the compensation amount.

6. The method as recited in claim 1 wherein modifying the command comprises reducing the desired magnitude of electric current by a compensation amount.

7. The method as recited in claim 6 wherein:

deriving an intermediate value comprises determining a difference between the desired magnitude of electric current designated by the command and a magnitude of electric current designated by a previous command;

multiplying the intermediate value comprises multiplying the difference by a value that characterizes how magnetic hysteresis affects operation of the electrohydraulic valve, thereby producing a preliminary compensation factor; and wherein modifying the command further comprises adding the preliminary compensation factor to a previous value of the compensation amount to produce a new value for the compensation amount.

8. The method as recited in claim 7 wherein modifying the command further comprises limiting the new value to a predefined range of values.

9. The method as recited in claim 1 further comprising:

receiving a signal from a user operated input device; and producing the command in response to that signal.

10. A method by which a controller operates an electrohydraulic valve, the method comprising:

deriving a characterization value that represents how magnetic hysteresis affects operation of the electrohydraulic valve;

receiving a command designating a magnitude of electric current to be applied to the electrohydraulic valve;

determining a compensation value in response to the command, the characterization value, and a previous compensation value;

producing a compensated command in response to the compensation value, wherein producing a compensated command comprises deriving an intermediate value denoting change of the command with time and multiplying the intermediate value by another value that characterizes how magnetic hysteresis affects electrohydraulic valve operation; and applying electric current to the electrohydraulic valve in response to the compensated command.

11. The method as recited in claim 10 further comprising:

receiving a signal from a user operated input device; and producing the command in response to that signal.

12. The method as recited in claim 10 wherein deriving a characterization value comprises:

producing a first set of data indicating relationships between magnitudes of electric current applied to the electrohydraulic valve and positions of the electrohydraulic valve while opening;

producing a second set of data indicating relationships between magnitudes of electric current applied to the electrohydraulic valve and positions of the electrohydraulic valve while closing; and determining the characterization value based how the first and second sets of data differ.

13. The method as recited in claim 10 wherein determining a compensation value comprises:

determining a difference between the command and a previous command that designated a desired magnitude of electric current;

producing a preliminary compensation factor by multiplying the difference and the characterization value; and producing the compensation value by adding the preliminary compensation factor to a previous compensation value.

14. The method as recited in claim 13 wherein determining a compensation further comprises limiting the compensation value to a predefined range of values.

15. The method as recited in claim 10 wherein producing a compensated command comprises modifying the command in response to the compensation value.

16. A method by which a controller operates an electrohydraulic valve, the method comprising:

deriving a characterization value that indicates how magnetic hysteresis affects operation of the electrohydraulic valve;

receiving a command designating a desired magnitude of electric current to be applied to the electrohydraulic valve;

determining a difference between the magnitude of electric current designated by the command and a magnitude of electric current designated by a previous command;

producing a preliminary compensation factor by multiplying the difference and the characterization value;

producing a compensation value by adding the preliminary compensation factor to a previous compensation value;

producing a compensated command by arithmetically combining the command and the compensation value; and applying electric current to the electrohydraulic valve in response to the compensated command.

17. The method as recited in claim 16 further comprising:

receiving a signal from a user operated input device; and producing the command in response to that signal.

18. The method as recited in claim 16 wherein determining a compensation further comprises limiting the compensation value to a predefined range of values.

19. The method as recited in claim 16 wherein deriving a characterization value comprises:

producing a first set of data indicating relationships between magnitudes of electric current applied to the electrohydraulic valve and positions of the electrohydraulic valve while opening;

producing a second set of data indicating relationships between magnitudes of electric current applied to the electrohydraulic valve and positions of the electrohydraulic valve while closing; and determining the characterization value based how the first and second sets of data differ.

* * * * *